United States Patent [19]

Grein et al.

[11] 4,237,732

[45] Dec. 9, 1980

[54] TEMPERATURE RESPONSIVE APPARATUS FOR DETECTING HEAT LEAKS

[75] Inventors: Louis F. Grein, Stow; John L. DuBois, Boxborough, both of Mass.

[73] Assignee: Enertron Corporation, Waltham, Mass.

[21] Appl. No.: 964,478

[22] Filed: Nov. 29, 1978

[51] Int. Cl.$^3$ ............................................. G01K 7/22
[52] U.S. Cl. ............................ 73/366 AR; 73/362 SC
[58] Field of Search ........ 73/190 H, DIG. 7, 362 SC, 73/362 AR; 338/22 SD, 22 R

[56] References Cited

U.S. PATENT DOCUMENTS

| | | | |
|---|---|---|---|
| 3,256,734 | 6/1966 | Storke, Jr. | 73/190 H |
| 3,348,415 | 10/1967 | Ash, Jr. | 73/362 AR |
| 3,915,003 | 10/1975 | Adams | 73/DIG. 7 |

*Primary Examiner*—Donald O. Woodiel
*Attorney, Agent, or Firm*—Kenway & Jenney

[57] ABSTRACT

A fast acting, temperature responsive apparatus provides a visual output representing a temperature difference. The apparatus is battery-operated and hand-held, and employs a low thermal mass thermistor, protectively housed in a hand-held probe, and an electrical circuit responsive to temperature differences registered by the thermistor. The circuit is "zeroed" or preset by a manually adjustable first panel control to the ambient temperature and any temperature change at the thermistor, relative to the preset ambient temperature, is visually indicated to the device user. The apparatus thus advantageously detects heat leaks, for example in the home.

6 Claims, 3 Drawing Figures

U.S. Patent     Dec. 9, 1980     4,237,732
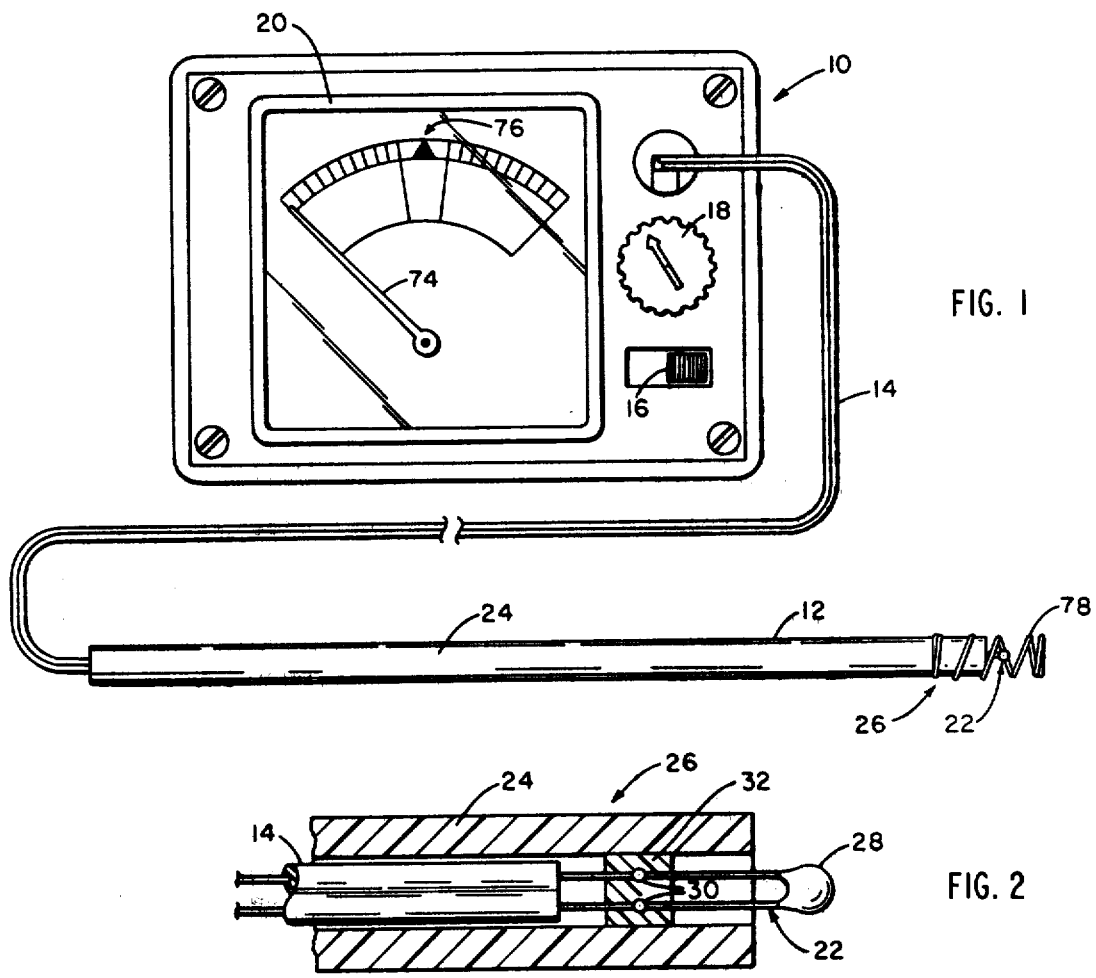
FIG. 1
FIG. 2
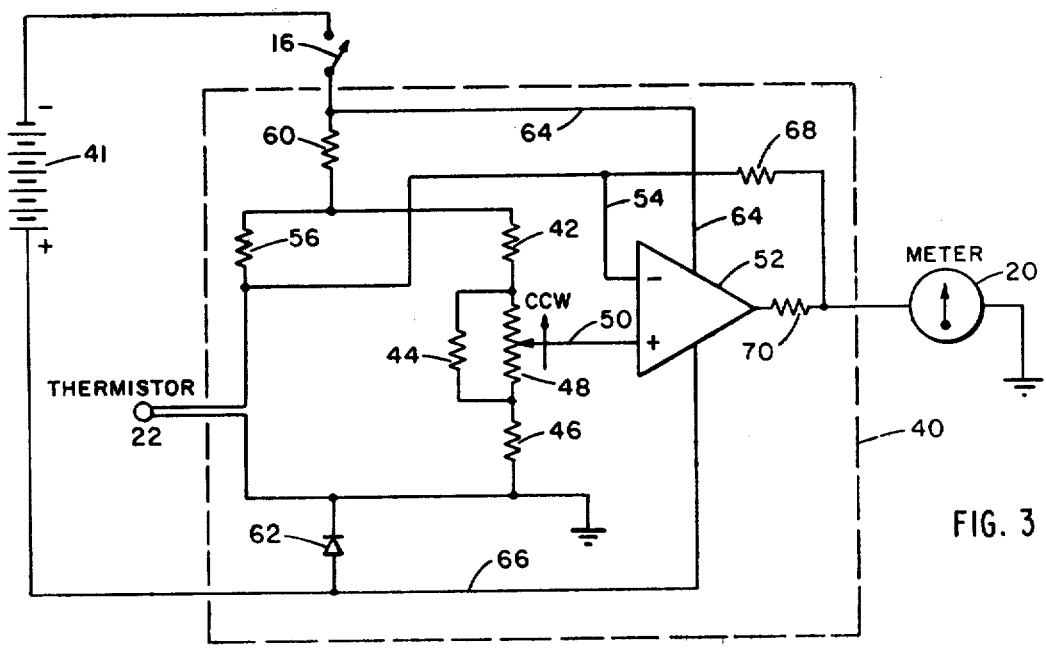
FIG. 3

TEMPERATURE RESPONSIVE APPARATUS FOR DETECTING HEAT LEAKS

BACKGROUND OF THE INVENTION

This invention relates generally to temperature responsive devices, and in particular, to a fast acting temperature responsive device for detecting temperature changes caused by, for example, heat escaping from a building.

The high costs of heating fuel, in combination with an increased public awareness that energy supplies are dwindling, has created a real need to locate and seal heat leaks, which result in energy waste. Unfortunately, however, apparatus has hitherto not been available, at a modest cost, which is capable of detecting heat leaks so that they may be sealed and thus allow fuel savings to be realized. The available equipment, made generally for commercial applications is capable of making precise temperature measurements, but either is beyond the price range of the average home owner or is cumbersome, slow acting, and/or tedious to use.

An object of this invention is therefore a fast acting, temperature responsive apparatus which is reliable, which is low in cost, and which detects small heat losses resulting in temperature differences as low as 1 or 2 degrees Fahrenheit. Another object of the invention is a hand-held apparatus which is simple to operate.

SUMMARY OF THE INVENTION

The temperature measuring apparatus of the invention is a hand-held, battery-operated, temperature-difference measuring apparatus. Unlike other temperature measuring devices, the apparatus of the invention does not measure absolute temperature which requires accurate precision components. Instead, the apparatus according to the invention provides an indication of the difference between the temperature being "read" and a preset temperature, generally room ambient.

The apparatus features a hand-held temperature sensitive probe having a housing for protectively mounting a low thermal-mass thermistor and means for connecting the thermistor to an electrical temperature-difference measuring circuit. The electrical circuit has a comparison circuit for comparing a temperature signal representative of the impedance of the thermistor with a presettable reference standard signal for providing an output signal which varies as a function of the temperature signal and the reference standard. An indicator responsive to the electrical circuit provides an indication to the user of the value of the output signal and this indication correlates with the temperature being measured. In a preferred aspect of the invention, the indicator is an electrical current sensitive meter.

In one aspect of the invention, the housing features an elongated hollow cylindrical element adapted to support the thermistor at one end thereof and the thermistor has a body portion extending beyond the one end. A low thermal-mass, gas-porous, cylindrically-shaped member fits over and is supported by the outside periphery of the cylindrical element at the one end and extends from the element toward and beyond the physical extent of the thermistor body. The member thus acts to physically protect the thermistor body portion while permitting the substantially unobstructed flow of air thereto. Preferably, according to the invention, the cylindrical member is a coil spring.

The comparison circuit features a difference amplifier having a first and a second input and an output, the output being proportional, over a linear operating range of the amplifier, to the difference of the amplifier inputs. The reference standard mentioned above is one of the inputs and the temperature signal is the other input. The comparison circuit drives the indicator which, as noted above, is preferably a current responsive meter.

DESCRIPTION OF THE DRAWINGS

Other objects, features, advantages of the invention will appear from the following description of a preferred embodiment of the invention taken together with the single sheet of drawings in which:

FIG. 1 is a diagrammatic representation of a preferred embodiment of the invention;

FIG. 2 is a cross-sectional view taken along lines 2—2 of FIG. 1; and

FIG. 3 is an electrical schematic diagram of a preferred electric circuit according to the invention.

DESCRIPTION OF A PREFERRED EMBODIMENT

Referring to FIG. 1, the temperature difference measuring apparatus comprises a battery-powered, hand-held electrical control housing 10 and a hand-held temperature sensitive probe 12. An electrical connecting line 14 connects the electrical control housing 10 to the temperature sensitive probe 12.

The electrical housing 10 has an on-off control switch 16, an adjustable control element 18 and a visual indicating device 20. In the illustrated embodiment, the indicating device is a current responsive meter. The temperature sensitive probe 12 has an elongated cylindrical element 24 and protectively houses a temperature sensitive element, preferably a low thermal mass thermistor 22. The probe supports the thermistor at one end 26 thereof.

Referring to FIG. 2, the thermistor has a body portion 28 which extends beyond end 26. The thermistor connects to connecting line 14 in the hollow interior of the cylindrical element 24, for example by a pair of solder connections 30; and the thermistor is held in place by a frictionally engaging cylindrical block member 32. Block member 32 frictionally resists the pull of connecting line 14 and thus maintains thermistor 22, and in particular body portion 28, in a known position. Other means for supporting the temperature sensitive element could also be used.

Referring to FIG. 3, the hand-held electrical control housing 10 has an electrical circuit 40 which is connected to a power source, battery 41 when control switch 16 is in the "ON" position. Circuit 40 drives the visual indicating device 20. Functionally, the electrical circuit effects a comparison between a signal output generated across thermistor 22 and a reference standard determined by a voltage divider consisting of illustrated resistors 42, 44, 46, and a variable resistor 48. Variable resistor 48 is the adjustable control element 18 and the position of the wiper 50 of resistor 48 is determined by the rotational position of the knob of element 18. The voltage level output over the wiper 50 is one of the inputs to an amplifier 52 and represents the reference standard.

The other input of amplifier 52 over a line 54 is derived from a voltage divider comprising a resistor 56 and thermistor 22. That voltage, which in the illustrated embodiment corresponds to the voltage across the impedance represented by thermistor 22, represents a thermistor generated output signal. The voltage divider consisting of resistor 56 and thermistor 22 is connected in parallel with the voltage divider consisting of resistors 42, 44, 46 and variable resistor 48. That parallel combination connects across the battery power source 41 through the on-off control switch 16, a resistor 60, and a voltage offsetting diode 62. The battery 41 also powers amplifier 52 over lines 64 and 66.

Amplifier 52, preferably an inexpensive operational amplifier such as the National type 741, is connected in a feedback circuit using resistors 68 and 70 to provide a stable and controlled gain. Amplifier 52 drives the indicator 20 through resistor 70.

In operation, the on-off switch 16 is turned to the "ON" position and adjustable control 18 is set so that the meter needle indicator 74 is positioned to a center position. This position is then a reference position 76, and corresponds to the ambient temperature measured when the probe 12 is held in the vicinity of the region to be examined. The hand-held probe 12 is then moved slowly past possible air leak and indicating needle 74 will vary above and below the center position. Each division of the scale can represent substantially any desired temperature difference by adjusting the circuit values of circuit 40; and in the illustrated embodiment, each division represents 1° F. Thus, sensed temperatures above the set ambient reference cause needle 74 to deflect above, i.e. to the right, of the center position and sensed temperatures below ambient cause the needle to deflect to the left.

The physical construction of the probe, and the small thermal mass of the thermistor and of a physical protection element 78 enable the apparatus to respond to temperature changes in approximately 1 second or less. Consequently, the indicating device 20 quickly registers a temperature difference. As shown in the preferred embodiment of the invention, the protection element 78 is a coil spring member which fits over and is supported by the outside periphery of the end 26 of elongated hollow cylindrical element 24. The coil spring 78 extends beyond the physical extent of the thermistor body portion 28. In other embodiments of the invention, coil spring 78 may be replaced by any low thermal mass, gas-porous member which can be supported by the elongated hollow cylindrical element 24.

There is thus shown a simple and inexpensive electrical circuit for operating the temperature difference apparatus. In the illustrated embodiment, the values for the various components are:

| | |
|---|---|
| Resistor 42 - | 18 kilohms |
| Resistor 44 - | 24 kilohms |
| Resistor 46 - | 20 kilohms |
| Resistor 56 - | 10 kilohms |
| Resistor 60 - | 68 kilohms |
| Resistor 68 - | 120 kilohms |
| Resistor 70 - | 680 ohms |
| Variable Resistor 48 - | 220 kilohms |

Thus, a fast acting temperature difference measuring device is provided which, because it measures temperature differences rather than absolute temperature, can be constructed using inexpensive reliable circuit components.

Other embodiments of the invention, including additions, subtractions, deletions, and other modifications of the disclosed preferred embodiment of the invention will be obvious to those skilled in the art and are within the scope of the following claims.

What is claimed is:

1. A hand-held, battery-operated, temperature-difference, ambient air measuring apparatus comprising
    a temperature sensitive probe having a housing for mounting a low thermal-mass thermistor in an ambient air exposed position, said housing having
        means for mounting said low thermal-mass thermistor in said ambient air exposed position out of contact with any heat sinking means and
        means for protecting said low thermal-mass thermistor from accidental contact with potentially damaging mechanical elements,
    an electrical temperature-difference measuring circuit,
    means for connecting said thermistor to said electrical temperature-difference measuring circuit,
    said electric circuit comprising
        a comparison circuit for comparing a temperature signal representative of the impedance of the thermistor with a presettable reference standard signal for providing an output signal which varies as a function of a difference between said temperature signal and said reference standard, and
        an indicator responsive to said electrical circuit for providing an indication of the value of the output signal.

2. The temperature-difference measuring apparatus of claim 1 wherein
    said comparison circuit comprises
        a difference amplifier having first and second inputs, and an output proportional, over a linear operating range of the amplifier, to the voltage difference of the inputs, and wherein
        said reference standard signal is one of said inputs and the temperature signal is the other of said inputs, and
    said indicator is a current responsive meter driven by said difference amplifier.

3. A hand-held, battery-operated, temperature-difference measuring apparatus comprising
    a temperature sensitive probe having a housing for protectively mounting a low thermal-mass thermistor,
    said housing having
        an elongated, hollow cylindrical element adapted to support said thermistor at one end thereof and said thermistor having a body portion extending beyond said one end,
        a low thermal-mass, gas porous, cylindrically-shaped member fitting over and supported by an outside periphery of said one end of said element and extending from said element beyond the physical extent of said supported thermistor body, and
        said member acting to physically protect said thermistor body portion while permitting the substantially unobstructed flow of air to the thermistor,
    an electrical temperature-difference measuring circuit,
    means for connecting said thermistor to said electrical temperature-difference measuring circuit,
    said electrical circuit comprising
        a comparison circuit for comparing a temperature signal representative of the impedance of the thermistor with a presettable reference standard signal for providing an output signal which varies as a function of a difference between said temperature signal and said reference standard, and an indicator reponsive to said electrical circuit for providing an indication of the value of the output signal.

4. The temperature-difference measuring apparatus of claim 3 wherein said cylindrical member is a coil spring.

5. The temperature-difference measuring apparatus of claim 3 wherein said probe has a response time of less than about one second.

6. A hand-held, battery-operated, temperature-difference measuring apparatus comprising a hand-held temperature sensitive probe having a housing for protectively mounting a low thermal-mass thermistor, the housing having an elongated, hollow, cylindrical element adapted to support said thermistor at one end thereof and said thermistor having a body portion extending beyond said one end, and a low thermal-mass, gas porous, cylindrically-shaped spring member fitting over and supported by an outside periphery of said one end of said element, and extending from said element beyond the physical extent of said thermistor body, whereby said spring member acts to physically protect said thermistor body portion while permitting the unobstructed flow of air to the thermistor, said thermistor thereby having a response time of less than about one second, an electrical circuit, means for connecting said thermistor to said electrical circuit, said electrical circuit comprising a comparison circuit for comparing a temperature signal representative of the thermistor impedance with a presettable reference standard signal for providing an output signal which varies as a function of a difference between the temperature signal and the reference standard, the comparison circuit having a difference amplifier having first and second inputs, and an output proportional, over a linear operating range of the amplifier, to the voltage difference of the inputs, and wherein said reference standard is one of said inputs and the temperature signal is the other of said inputs, and a current responsive meter, driven by said electrical circuit output, for providing a visible indication of the value of the amplifier output signal.

* * * * *